(No Model.)
J. T. PRIOR.
WHEEL TIRE.
No. 273,147. Patented Feb. 27, 1883.
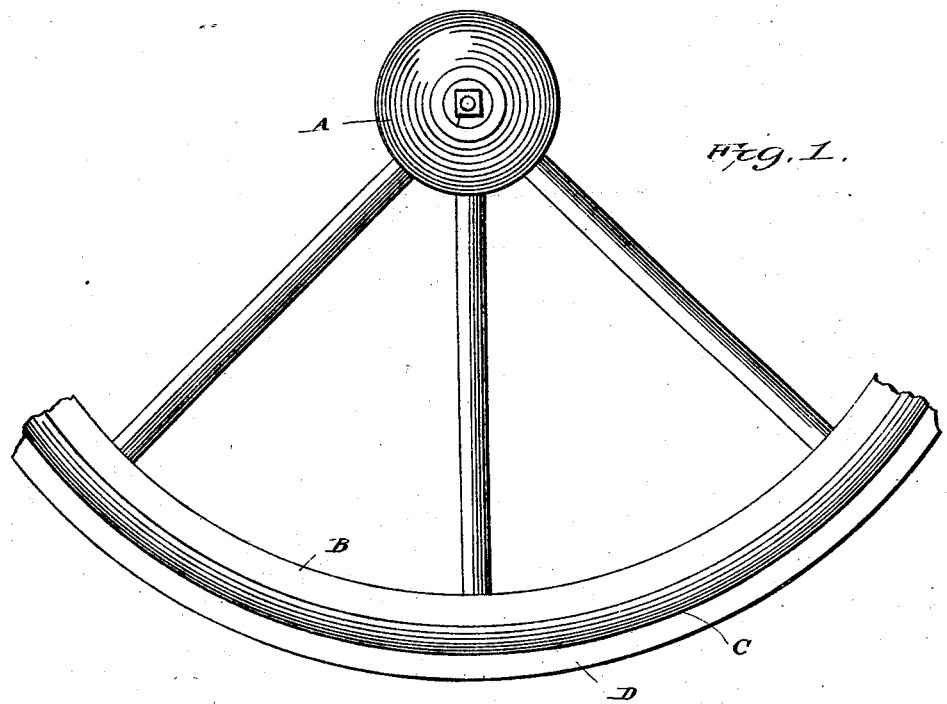
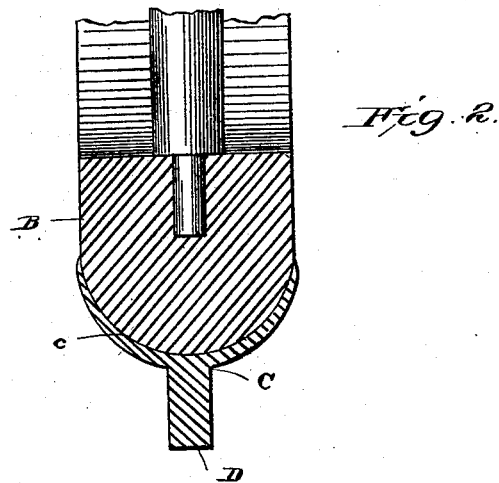

UNITED STATES PATENT OFFICE.

JOHN T. PRIOR, OF PRIOR'S STATION, GEORGIA.

WHEEL-TIRE.

SPECIFICATION forming part of Letters Patent No. 273,147, dated February 27, 1883.

Application filed January 16, 1883. (No model.)

*To all whom it may concern:*

Be it known that I, JOHN T. PRIOR, a citizen of the United States, residing at Prior's Station, in the county of Polk and State of Georgia, have invented certain new and useful Improvements in Wheel-Tires; and I do hereby declare the following to be a full, clear, and exact description of the invention, such as will enable others skilled in the art to which it appertains to make and use the same.

This invention relates to certain improvements in tires for the wheels of rolling vehicles; and it has for its objects to provide a tire of such form and construction as will afford protection against the abrasive action on the sides of the fellies, near the periphery thereof, that will brace the fellies against lateral spreading, and which will possess great strength and an increased amount of wearing-surface, all of which will more fully hereinafter appear.

In the accompanying drawings, forming a part of this specification, and on which like letters of reference indicate corresponding parts, Figure 1 represents a side elevation of a portion of a wheel having my improved tire applied thereto; and Fig. 2, a cross-sectional view of the felly and the tire, showing a spoke in place and the relative position of the several parts.

The letter A designates the hub of a vehicle-wheel, having the usual spokes secured therein in the common and ordinary manner, and the letter B the rim or felly thereof. The circumference or outer periphery of the said rim is of semicircular or approximately of semicircular form in cross-section, as seen in Fig. 2 of the drawings, the object of which will presently appear.

The letter C indicates my improved tire, the same consisting of the semi-cylindrical annular felly bearing or seat c, and of the circumferential rib or head D. The bearing and rib are made integral, the tire being rolled in this form as it passes through or between the forming-rolls. By reference to Fig. 2 it will be observed that the face of the rim or felly fits well down into the annular seat c, the wings of the latter snugly embracing the sides of the rim, affording it protection against the abrasive action of the road or earth, and serving the function of sustaining the rim against lateral spreading, occasioned by the vertical cracking or splitting of the fibers. The circumferential head or rib D receives the greater portion of the wear, and serves to give the seat strength and to admit of its being made much thinner and lighter.

By reason of the cross-sectional shape of my improved tire—namely, the semi-cylindrical form—the necessity of supplying the tire and rim with bolt-holes and the use of bolts are entirely obviated, resulting in a saving of material and labor in the manufacture, and a consequent reduction of cost. The tire is heated to the proper degree, and the expansion of the iron (which is longitudinally three-eighths of an inch to the foot, and laterally the same ratio, according to the thickness of the iron) admits of placing the rim within its annular seat.

Having thus fully described my invention, what I claim, and desire to secure by Letters Patent, is—

As a new article of manufacture, a rolling-vehicle-wheel tire rolled in annular form, and having a felly-seat of semicircular form in cross-section, the wings whereof inclose and protect the sides of the felly, and provided with a circumferential central strengthening head or rib, as shown and described.

In testimony whereof I affix my signature in presence of two witnesses.

JOHN T. PRIOR.

Witnesses:
C. D. DAVIS,
H. A. TOULMIN.